United States Patent [19]

Barlier et al.

[11] Patent Number: 4,532,221
[45] Date of Patent: Jul. 30, 1985

[54] DECORATIVE ENAMEL FOR GLASS-CERAMICS HAVING LOW COEFFICIENTS OF THERMAL EXPANSION

[75] Inventors: Pernette R. M. Barlier, Vulaines sur Seine; Gerard R. Boury, Nemours; Jean-Pierre Mazeau, Avon, all of France

[73] Assignee: Corning Glass Works, Corning, N.Y.

[21] Appl. No.: 581,729

[22] Filed: Feb. 21, 1984

[30] Foreign Application Priority Data

Jun. 15, 1983 [FR] France ............................ 83 09870

[51] Int. Cl.³ .......................... C03C 3/10; C03C 5/00; C03C 3/22
[52] U.S. Cl. .......................................... 501/22; 501/4; 501/8; 501/23; 501/61; 501/62; 501/74; 501/75; 501/76
[58] Field of Search ................... 501/4, 7, 8, 22, 23, 501/62, 74, 75, 61, 76

[56] References Cited

U.S. PATENT DOCUMENTS

| | | | |
|---|---|---|---|
| 3,384,508 | 5/1968 | Bopp et al. | 501/8 |
| 3,418,156 | 12/1968 | Medert et al. | 501/23 |
| 3,428,466 | 2/1969 | Wolf et al. | 501/21 |
| 3,463,647 | 8/1969 | Kosiorek et al. | 501/7 |
| 3,503,763 | 3/1970 | Mills | 501/7 |
| 3,663,244 | 5/1972 | Martin | 501/69 |
| 4,331,768 | 5/1982 | Boyd et al. | 501/23 |

*Primary Examiner*—Mark L. Bell
*Attorney, Agent, or Firm*—C. S. Janes, Jr.

[57] ABSTRACT

This invention is concerned with the preparation of thermally crystallizable enamels suitable for application to glass-ceramics, particularly glass-ceramics having coefficients of thermal expansion less than $15 \times 10^{-7}/°C$. The enamels are capable of being fired to maturity simultaneously with the precursor glass body being crystallized to a glass-ceramic. The enamels consist essentially, expressed in weight percent on the oxide basis, of:

$SiO_2$: 36–58
$Al_2O_3$: 8.5–16
CaO: 0.5–10
PbO: 27–40
$K_2O$: 0.5–6

5 Claims, No Drawings

DECORATIVE ENAMEL FOR GLASS-CERAMICS HAVING LOW COEFFICIENTS OF THERMAL EXPANSION

BACKGROUND OF THE INVENTION

The object of the present invention is to produce non-toxic, crystallizable enamels for the decoration of glass-ceramics having low coefficients of thermal expansion.

Glass-ceramics have been employed in the fabrication of culinary ware for about two decades. The glass compositions utilized for that purpose have demonstrated a refractory character and a low coefficient of thermal expansion, this second property imparting good thermal shock resistance to the materials. Continuing research in the area of glass-ceramics for the fabrication of culinary ware has involved the development of enamels permitting them to be decorated; the aesthetic appearance of culinary articles being of great importance to the purchaser.

The origin of the recourse to enamels and glazes for decorating ceramic articles goes back to antiquity. (One commonly defines a "glaze" as being a transparent glass, and an "enamel" as a glass containing particles in suspension.) The classical enamels and glazes employed in decorating culinary articles have relatively high coefficients of thermal expansion (generally ranging between $50-120 \times 10^{-7}/°C$.;) they cannot, therefore, be utilized on glass-ceramics having low coefficients of thermal expansion without crazing or spalling.

Numerous researchers have sought to find enamels and glazes applicable to highly refractory glass-ceramics with a low coefficient of thermal expansion. In this respect it is possible to cite the state of the prior art:

U.S. Pat. No. 3,418,156 describes glazes having high coefficients of thermal expansion but which can be applied to glass-ceramic substrates having a coefficient of thermal expansion below $25 \times 10^{-7}/°C$. over the range of 0°-300° C.

The composition of the glazes, expressed in weight percent on the oxide basis, comprises primarily:

PbO: 35–60
$SiO_2$: 7.5–30
$Cr_2O_3$: 0.2–19
$B_2O_3$: 3–12
$Al_2O_3$: 0.3–7

The mechanism to avoid the formation of cracking and/or spalling during the firing of the glaze is not known with certainty. It is supposed that a reaction takes place at the interface between the glaze and the glass-ceramic that modifies the crystallization of the glass-ceramic and increases the bonding force between the glaze and the glass-ceramic substrate.

U.S. Pat. No. 3,428,466 describes enamels that crystallize when they are applied and fired onto glass-ceramic substrates having low coefficients of thermal expansion. In these enamels the crystallized phase is beta-spodumene and the coefficient of thermal expansion of the enamel is comparable to that of the glass-ceramic substrates. The composition of the enamel, expressed in weight percent on the oxide basis, consisted essentially of:

$SiO_2$: 50–70
$B_2O_3$: 10–25
$Al_2O_3$: 8–18
$Li_2O$: 0.1–10
$TiO_2$: 0.1–6
$Bi_2O_3$: 0.1–6

U.S. Pat. No. 3,463,647 describes crystallizable enamels for glass-ceramic substrates of low coefficient of thermal expansion. The crystallized phase in the enamel is beta-eucryptite; the coefficient of thermal expansion of the enamel is therefore in accord with that of the substrate. The composition of the enamel, expressed in weight percent on the oxide basis, consists essentially of:

$SiO_2$: 40–67
$B_2O_3$: 0.1–10
$Al_2O_3$: 17–31
$Li_2O$: 3–13
$TiO_2$: 0.1–9

U.S. Pat. No. 3,503,763 describes compositions of devitrifiable glasses for solder glasses and coatings; the crystalline phases here are beta-spodumene or beta-eucryptite. The compositions of these enamels, expressed in weight percent on the oxide basis, consist essentially of:

PbO: 13–23
$B_2O_3$: 4–11
$Li_2O$: 4–6
$Al_2O_3$: 14–19
$SiO_2$: 39–50 and these crystallized materials have a coefficient of thermal expansion of between $-5$ and $30 \times 10^{-7}/°C$.

U.S. Pat. No. 3,663,244 describes thermally devitrifiable enamels for decorating or protecting glass-ceramic articles; those enamels having a coefficient of thermal expansion between about $15-30 \times 10^{-7}/°C$. The base composition of those enamels, expressed in weight percent on the oxide basis, consists of:

PbO: 62–68
$TiO_2$: 12–16
$SiO_2$: 14–20
$B_2O_3$ and/or ZnO and/or BaO and/or $P_2O_5$: 0–2
$Al_2O_3$: 2–4
$SnO_2$: 0–4

The crystallizable phase here is lead titanate when the enamel is fired between 700°-850° C.

U.S. Pat. No. 4,331,768 describes glazes having relatively high coefficients of thermal expansion suitable for decorating glass-ceramic culinary ware. Crystals of cassiterite develop during firing of the glaze; the composition of those glazes, expressed in weight percent on the oxide basis, consisting primarily of:

$SiO_2$: 37–49
$Al_2O_3$: 4–7
$B_2O_3$: 6.5–11
$ZrO_2$: 0–1.75
$Na_2O$: 1.75–3.5
$K_2O$: 0.75–2.5
PbO: 21–32
CdO: 0–0.75
CaO: 1–9
$TiO_2$: 0–0.35
F: 0–0.6

An enamel or glass utilized for the fabrication of cookware or tableware should not release toxic substances when in use. Lead and/or cadmium are often employed in the manufacture of enamels or glazes because they permit the obtaining of a material with a high index of refraction and/or because they improve the flow of the enamel during firing. However, these two elements are extremely toxic; the glaze or enamel must, therefore, exhibit good resistance to chemical attack caused by food products.

It is possible to produce transparent or opaque glass-ceramics, depending upon the composition of the glass and/or the heat treatment applied to it. Glass-ceramics are normally transparent when the crystals they contain are smaller than the wavelength of visible light and/or because they exhibit very little birefringence and their index of refraction is close to that of the residual glass phase.

The compositions of the crystal phases generally present in those glass-ceramics belong to the $Li_2O$—$Al_2O_3$—$SiO_2$ system; the most frequent are solid solutions of $\beta$-eucryptite and $\beta$-quartz. Some examples of compositions of transparent glass-ceramics are described in the following patents:

U.S. Pat. No. 3,157,522 describes the fabrication of transparent glass-ceramics obtained through the thermal treatment of glass having compositions belonging to the $Li_2O$—$Al_2O_3$—$SiO_2$—$TiO_2$ quaternary; some minor constituents such as $Na_2O$, $K_2O$, and $B_2O_3$ have been added thereto to soften the glass; the principal crystal phase therein being $\beta$-eucryptite.

U.S. Pat. No. 3,252,811 describes the fabrication of transparent glass-ceramics in which the major crystal phase is a solid solution of $\beta$-quartz. The composition of the base glass belongs to the XO—$Al_2O_3$—$SiO_2$ system and $ZrO_2$ is utilized as the nucleating agent (XO designates $Li_2O$+ZnO and/or MgO).

U.S. Pat. No. 3,241,985 describes transparent glass-ceramics in which the principal crystal phase is $\beta$-eucryptite. The composition of the glass belongs to the $Li_2O$—$Al_2O_3$—$SiO_2$ system and the nucleation agent is $ZrO_2$. Small quantities of alkali metal oxides, alkaline earth metal oxides, and/or $TiO_2$ may be added to the composition.

U.S. Pat. No. 3,282,712 describes the fabrication of transparent glass-ceramics wherein the major crystal phase is $\beta$-eucryptite. The compositions belong to the $Li_2O$—$Al_2O_3$—$SiO_2$—$P_2O_5$ field, the nucleation agents being $ZrO_2$ and $TiO_2$. Small quantities of alkaline earth metal oxides may be introduced into the composition.

U.S. Pat. No. 3,484,327 describes obtaining transparent glass-ceramics containing $\beta$-eucryptite, produced in the $Li_2O$—$Al_2O_3$—$SiO_2$ system and nucleated by $TiO_2$+$ZrO_2$. Alkali metal oxides, alkaline earth metal oxides, and $B_2O_3$ may advantageously be added.

U.S. Pat. No. 3,499,773 relates to transparent glass-ceramics containing $\beta$-eucryptite as the principal crystal phase produced in the $Li_2O$—$Al_2O_3$—$SiO_2$ system, the nucleation agents being $TiO_2$ and/or $ZrO_2$ and/or $SnO_2$. Additions of small quantities of alkali metal oxides, alkaline earth metal oxides, and $P_2O_5$ may be included in the composition.

U.S. Pat. No. 3,677,785 describes compositions in the system $Li_2O$—BaO—MgO—$Al_2O_3$—$SiO_2$ with $TiO_2$ and $ZrO_2$ as nucleating agents. Addition of small amounts of alkali metal oxides and/or $B_2O_3$ may be made.

U.S. Pat. No. 3,788,865 relates to the production of glass-ceramic articles in which $\beta$-eucryptite is the major crystal phase obtained by heat treating glasses having compositions belonging to the $Li_2O$—$Al_2O_3$—$SiO_2$ system nucleated by $TiO_2$ and/or $ZrO_2$ and/or $SnO_2$. Addition of alkaline earth metal oxides, $P_2O_5$ and $B_2O_3$ as well as conventional coloring agents are possible.

U.S. Pat. No. 4,018,612 describes transparent glass-ceramics having $\beta$-quartz solid solution as the major crystal phase produced from a glass in the $Li_2O$—MgO—ZnO—$Al_2O_3$—$SiO_2$ system nucleated with $TiO_2$+$ZrO_2$. Minor additions of BaO and conventional colorants are proposed.

U.S. Pat. No. 4,093,468 covers compositions of transparent and colorless glass-ceramics in the $Li_2O$—$Al_2O_3$—$SiO_2$ system nucleated by $TiO_2$; the major crystal phase is $\beta$-quartz solid solution. The introduction of small quantities of neodymium oxide permits obtaining colorless glass-ceramics.

U.S. Pat. No. 4,211,820 describes the production of a transparent glass-ceramic having $\beta$-spodumene as the principal crystal phase. On the surface of the glass-ceramic is a thin film having $\beta$-quartz solid solution as the principal crystal phase. The composition of the base glass belongs to the $Li_2O$—MgO—ZnO—$Al_2O_3$—$SiO_2$—$TiO_2$ system to which $V_2O_5$ is added to obtain a brown coloration.

On another plane, U.S. Pat. No. 4,187,155 describes highly crystalline glass-ceramics having anorthite as the principal crystal phase. The compositions of the glasses of that invention, expressed in weight percent on the oxide basis, belong to the following area.

CaO: 10–18
$Al_2O_3$: 29–35
$SiO_2$: 30–39
$TiO_2$: 13–20

Up to 10% total of oxides such as MgO, SrO, BaO, PbO, CdO, $P_2O_5$, and F may be included within the following limits: up to 3% MgO, up to 10% SrO, up to 5% BaO, up to 7% PbO, up to 5% CdO, up to 6% $P_2O_5$, and up to 1.5% F.

But such materials are too crystalline to serve as enamels with good flow.

SUMMARY OF THE INVENTION

Turning to the present invention, it essentially envisages enamels usable for decorating glass-ceramic articles, and primarily transparent glass-ceramic articles having a coefficient of thermal expansion below $15\times10^{-7}/°C.$ between $25°$–$300°$ C., those enamels having the following characteristics:

(a) excellent adhesion to the glass-ceramic without apparent crazing or spalling;

(b) the same absence of crazing and spalling after maintaining a glass-ceramic coated with the enamel at $620°$ C. for 200 hours and submitting to repeated thermal shocks (from $620°$ C. into water at about $10°$ C.);

(c) non-toxicity of the enamel, that is to say, the quantity of lead released into a dilute aqueous solution of 4% by volume acetic acid for 24 hours at $22°$ C. is less than 15 $\mu g/cm^2$ of enameled surface (that property is of critical importance if the product is destined for the fabrication of cookware and tableware).

Another objective of the present invention is to provide enamels that may be fired on the glass-ceramic upon which they are applied during the heat treatment cycle designed to crystallize the initial glass to obtain a glass-ceramic.

Those objectives are attained with enamels crystallizable by heat treatment of the compositions, expressed in weight percent on the oxide basis, belonging to the following system:

$SiO_2$: 36–58
$Al_2O_3$: 8.5–16
PbO: 27–40
$K_2O$: 0.5–6
CaO: 0.5–10

Different components may be included in the composition on the condition that the total quantity does not exceed about 10% by weight. For example, it is possible to include up to 3.5% $Li_2O$, up to 4% $B_2O_3$, up to 2.5% $TiO_2$, up to 2.5% $ZrO_2$, up to 3% $TiO_2+ZrO_2$ up to 4% F, up to 2% MgO, up to 6% BaO, up to 3% ZnO, up to 6% MgO+BaO+ZnO, and up to 1% $P_2O_5$.

When the enamel is to be applied to the already crystallized glass-ceramic and not to the glass before crystallization, the composition will preferably contain $Li_2O$ and CaO, the total quantity being greater than 2.7%.

The enamels are prepared through the following operations:

(1) melting a batch to obtain the desired composition;

(2) transforming the glass obtained into glass powders with a mean diameter smaller than 25 microns and, preferably, less than 15 microns.

The enamels are applied to the glass or to the already crystallized glass-ceramic by the process described below:

(a) The finely-divided glass powders (frit) are mixed with a commercial organic binder to obtain a paste having a viscosity of about 150–600 centipoises;

(b) the paste is deposited onto the glass or the already crystallized glass-ceramic;

(c) the enamel coated substrate is subjected to a thermal cycle at temperatures between 800°–950° C. for a temperature sufficiently long to permit maturing of the enamel and, where the case applies, to crystallize the glass to obtain a glass-ceramic.

It is preferable to utilize organic media, rather than water, to prepare the paste because they are more easily eliminated through volatilization. Pigments can be added to this paste to obtain colored enamels, these additions generally being limited to 10% by weight.

The duration of thermal treatment necessary for maturing the enamel can vary from a few minutes to several hours, depending upon the temperature employed. Longer heat treatments are possible but the decorated articles do not exhibit substantially improved properties, so that the cost of longer heat treatments render that operation unattractive. Naturally, when the enamels are to be fired during the heat treatment to effect the conversion of the base glass into a glass-ceramic, the treatment will be continued until the desired level of crystallization is attained in the glass-ceramic.

The obtaining of enamels having the above-described properties is linked to the fact that their composition belongs to the above-described field. The various components of the enamel will be such that the quantity of PbO contained in the enamel will be maintained between 27–40% by weight; if the PbO content is reduced below 27%, the flow of glass during the heat treatment will not be sufficient to insure the formation of a smooth, non-porous enamel; for a lead content greater than 40%, the coefficient of thermal expansion of the enamel is raised to such an extent that cracks and scales can result on its surface.

CaO must be maintained between 0.5–10% by weight and $Al_2O_3$ between 8.5–10% by weight to permit the crystallization of an anorthite-type structure ($CaO.Al_2O_3.2SiO_2$) into which ions such as $Pb^{+2}$ and $K^+$ may be inserted; the thermal expansions of those phases are close to $35-45\times10^{-7}/°C$. CaO also improves glass flow, but, present in excessive quantities, it increases the crystallization of the enamel which can lead to the formation of a rough surface.

It is possible to introduce up to 6% by weight $K_2O$ into the composition. $K_2O$ retards the crystallization of the enamel but increases its thermal expansion.

The introduction of $Li_2O$ into the composition permits the development of secondary crystal phases such as β-spodumene or β-quartz solid solution during the heat treatment. Those two phases have a coefficient of thermal expansion lower than $15\times10^{-7}/°C$. between 25°–300° C.

The presence of those crystal phases permits the reduction of the coefficient of expansion of the enamel. Nevertheless, the level of $Li_2O$ must not exceed 3.5% by weight to avoid the excessive development of low temperature crystal phases (such as β-quartz solid solutions) which prevent flow of the glass and, hence, flow of the enamel.

It is possible to introduce up to 4% by weight $B_2O_3$ to increase the flow of the glass during the firing of the enamel. However, it is preferable not to use it when the enamel is to be utilized on glass-ceramic substrates containing fluorine. It is thought that boron reacts with the fluorine in the substrate to form $BF_3$ which attacks the glass-ceramic, forming a "halo" around the decorated areas. Moreover, enamels containing lead and boron release a large quantity of lead when in contact with a dilute acid solution such as that described above.

Fluorine facilitates the flow of the glass, but the quantity introduced into the glass will be less than or equal to 4% by weight to avoid opalization or crystallization of the glass during cooling. The quantity of fluorine volatilized during melting of the glass varies generally between 25–40%.

The introduction of $TiO_2$ and/or $ZrO_2$ improves the homogeneity of the crystallization, especially in those glasses containing lithium. Nevertheless, the overall total of those two constituents will not exceed 3% by weight to avoid excessive crystallization.

$P_2O_5$ may also be employed as a nucleating agent to promote homogeneous nucleation. Its presence will range between 0.1–0.7%. In the presence of $TiO_2$ and/or $ZrO_2$, it will advantageously be limited to 0.4% to avoid excessive crystallization.

Other oxides such as MgO, BaO, and ZnO may be introduced but in relatively low levels to avoid the development of secondary crystal phases.

In general, the crystal phases will represent less than 50% of the volume of the enamel. The vitreous phase of the enamel permits the attainment of a smooth and shiny surface.

The enamels exhibiting the best flow, the best adhesion to the substrate, the best resistance to thermal shock, and the lowest release of lead have compositions belonging to the following system:

$SiO_2$: 36–58
$Al_2O_3$: 9–14
CaO: 2–8
PbO: 28–35
$TiO_2$ and/or $ZrO_2$: 0.5–1.5 or
$P_2O_5$: 0.1–0.7
$K_2O$: 1–3
$Li_2O$: 1–2.5

Most often, the glass-ceramic article is obtained through a two-stage treatment of the glass, consisting of a first step in the region of the nucleation temperature for 1–2 hours, followed by a period of 1–6 hours at higher temperature, in the course of which crystallization is effected. The firing of the inventive enamels may be effected in the course of such thermal cycles.

As has been mentioned above, the enamels described in the invention may be deposited on the crystallized glass-ceramic. This glass-ceramic may be either transparent or opaque. These opaque glass-ceramics generally result from the same composition system as the transparent glass-ceramics, but are treated at higher temperature (generally above 1000° C.). The principal crystal phase is β-spodumene.

The procedures for the preparation, the application, and the firing of the enamels described above are also applicable, but the heat treatment employed to obtain maturation of the enamel is of shorter duration (generally less than one hour) and is effected at lower temperatures (generally below 900° C.), such that the properties of the glass-ceramic will not be affected. The enamels obtained are generally smoother and shinier. The principal crystal phase is then a β-quartz solid solution rather than anorthite.

DESCRIPTION OF PREFERRED EMBODIMENTS

The table appearing at the end of the text presents a certain number of glass compositions suitable for obtaining enamels according to the present invention. These compositions are expressed in weight percent on the oxide basis. The content of fluorine is expressed in weight percent in excess relative to the oxides. The batch materials utilized are either oxides or other compounds which, during melting, are transformed into oxides in proportions corresponding to the desired compositions.

In the examples described below, each composition is weighed, mixed in a ball mill to promote the homogeneity of the melt, then placed into platinum crucibles. The crucibles are introduced into a furnace at a temperature close to 1500°–1600° C., the melting cycle lasting about 24 hours and the glass preferably being homogenized by stirring. The molten glass is then poured into water in order to obtain glass particles 10–25 mm in diameter. After drying, the glass is ground for 8–16 hours in jars containing alumina balls. The average size of particles thus obtained is 12 microns. (It is also possible to utilize grinding by air jets which permits particles having an average size of about 6 microns to be obtained.)

Bars (50×5×5 mm) are pressed from these powders and heat treated utilizing the cycle simulating the application of the enamel to a precursor glass substrate and the maturation of the enamel during the cycle which insures the transformation in situ of the glass into a glass-ceramic. The bars are heated up to 700° C., maintained about one hour at that temperature; the temperature then raised up to about 870° C. and the samples maintained for two hours at that temperature; the cooling is effected at furnace rate to ambient temperature. The values of the coefficients of thermal expansion between 20°–300° C. ($\times 10^{-7}$/°C.) and the lead release ($\mu g/cm^2$) are given in the table below.

To simulate the application of these enamels to already crystallized glass-ceramics, other bars are pressed from the above-described compositions and heat treated for five minutes at about 800° C. X-ray diffraction analyses indicated that β-quartz solid solution predominates at the expense of anorthite, except in Example 5 which contains no lithium. The values of the coefficients of thermal expansion are also reported in the table. The lead release is slightly higher, but still far below the acceptable maximum.

The frit of Example 7 is mixed with a commercial organic medium to obtain a paste having a viscosity between 150–600 centipoises. The paste is then applied to a glass plate whose composition is described in U.S. Pat. No. 4,211,820. The glass plate coated with its enamel is subjected to a heat treatment requiring a nucleation step of one hour at 700° C. followed by a crystallization step of two hours at 870° C. The glass plate is then transformed into a highly crystallized material; the enamel is partially crystallized, the principal crystal phase being anorthite and a secondary crystallization of β-quartz solid solution may also be observed.

The enamel exhibits excellent adhesion to the glass-ceramic plate; the lead release from the enamel when placed into contact with a dilute solution of acetic acid is only 0.48 $\mu g/cm^2$. After maintaining for 200 hours at 620° C., no discoloration of the enamel is observed. The glass-ceramic plate is alternately heated five times to 620° C. and then quenched in water at 10° C. without the appearance of crazing or spalling.

It is possible to introduce up to 10% by weight of different pigments into the paste to color it. For example, mixtures of the oxides of iron, chromium, lead, antimony, and titanium may be utilized to obtain a palette of colors. It has been observed that the presence of pigments favors the growth of β-quartz solid solution at the expense of anorthite.

The powder of Example 11 is also mixed with the organic medium described above to obtain a paste of a viscosity between 150–600 centipoises. The paste is applied to a flat plate of glass whose composition is described in U.S. Pat. No. 4,018,612. The glass coated with its enamel is then subjected to a thermal cycle comprising a nucleation step of 30 minutes at 750° C. followed by a crystallization step of 30 minutes at 900° C. As before, the glass is transformed into a highly crystalline glass-ceramic; the enamel is partially crystallized, the principal crystal phase being anorthite and a small quantity of β-quartz solid solution may also be detected.

The adhesion of the enamel is complete, the lead release non-existent. Repeated thermal shocks have no effect upon the properties of the enamel nor on the bond between then enamel and the glass-ceramic.

TABLE

|   | 1 | 2 | 3 | 4 | 5 | 6 | 7 | 8 | 9 | 10 | 11 | 12 |
|---|---|---|---|---|---|---|---|---|---|---|---|---|
| PbO | 27.2 | 27.5 | 27.7 | 28.2 | 28.5 | 28.8 | 29.0 | 29.1 | 29.3 | 29.8 | 31.1 | 37.8 |
| $Al_2O_3$ | 8.9 | 12.6 | 12.6 | 12.9 | 13.0 | 13.1 | 13.2 | 13.3 | 10.8 | 13.2 | 11.8 | 12.1 |
| CaO | 1.9 | 3.4 | 3.4 | 3.5 | 7.0 | 3.6 | 3.6 | 3.6 | 3.6 | 3.6 | 3.6 | 3.6 |
| $SiO_2$ | 57.4 | 46.2 | 46.6 | 47.4 | 48.4 | 47.7 | 48.9 | 50.6 | 50.8 | 48.5 | 47.3 | 44.4 |
| $Li_2O$ | 1.4 | 1.8 | 1.8 | 1.8 | — | 1.9 | 1.9 | 1.4 | 1.9 | 1.9 | 1.9 | 1.6 |
| $K_2O$ | 2.5 | 2.3 | 2.3 | 2.3 | 2.4 | 2.4 | 2.4 | 1.0 | 2.4 | 2.4 | 2.4 | 2.0 |
| MgO | — | — | 1.0 | — | — | — | — | — | — | — | — | — |
| BaO | — | 5.4 | 3.6 | — | — | — | — | — | — | — | — | — |
| ZnO | — | — | — | 2.9 | — | — | — | — | — | — | — | — |
| $TiO_2$ | 0.9 | 1.0 | 1.0 | 1.0 | 1.0 | 1.0 | 1.0 | 0.9 | 1.0 | — | 1.0 | 0.8 |
| $ZrO_2$ | — | — | — | — | — | — | 1.5 | — | — | — | — | — |

TABLE-continued

| | 1 | 2 | 3 | 4 | 5 | 6 | 7 | 8 | 9 | 10 | 11 | 12 |
|---|---|---|---|---|---|---|---|---|---|---|---|---|
| P$_2$O$_5$ | — | — | — | — | — | — | — | — | — | 0.4 | — | — |
| B$_2$O$_3$ | — | — | — | — | — | — | — | — | — | — | 0.9 | — |
| F | 1.0 | 2.0 | 2.0 | 2.0 | 2.0 | — | 2.0 | 2.0 | 2.0 | 2.0 | — | 2.0 |
| Heat Treatment | \multicolumn{12}{c}{1 hr at 700° C. followed by 2 hrs at 870° C.} |
| Coef. Exp. | — | — | — | — | — | — | 33.1 | — | 42 | — | 36.7 | 32.4 |
| Lead Release | 0.84 | 0.87 | 1.30 | 0.68 | 0 | 0 | 0.25 | 0 | 0 | — | 0.30 | 0 |
| Heat Treatment | \multicolumn{12}{c}{5 minutes at about 800° C.} |
| Coef. Exp. | — | — | — | — | — | — | 33.4 | — | — | — | 34.9 | 37.7 |
| Lead Release | 1.36 | 0.77 | 1.20 | 1.12 | 2.25 | 0 | 0.92 | 0 | 0.61 | — | — | 0 |

We claim:

1. A thermally crystallizable enamel composition suitable for application to glass-ceramic substrates having coefficients of thermal expansion less than $15 \times 10^{-7}/°C.$, said enamel composition, upon crystallization, exhibiting the qualities of excellent adhesion to a glass-ceramic substrate, a lead release of less than 15 $\mu g/cm^2$, when in contact with a dilute solution of acetic acid (4% by volume) for 24 hours at 22° C., and resistance to repeated thermal shocks by heating to 620° C. followed by immersion into water at 10° C. without apparent degradation, and consisting essentially, expressed in weight percent on the oxide basis, of:

SiO$_2$: 36–58
Al$_2$O$_3$: 8.5–16
CaO: 0.5–10
PbO: 27–40
K$_2$O: 0.5–6.

2. An enamel composition according to claim 1 also containing up to about 10% by weight of the following materials in the indicated proportions of up to 3.5% Li$_2$O, up to 4% B$_2$O$_3$, up to 2.5% TiO$_2$, up to 2.5% ZrO$_2$, up to 3% TiO$_2$+ZrO$_2$, up to 4% F, up to 2% MgO, up to 3% ZnO, up to 6% BaO, up to 6% MgO+BaO+ZnO, and up to 1% P$_2$O$_5$.

3. An enamel composition according to claim 1 consisting essentially of:

SiO$_2$: 36–58
Al$_2$O$_3$: 9–14
CaO: 2–8
PbO: 28–35
TiO$_2$ and/or ZrO$_2$: 0.5–1.5 or
P$_2$O$_5$: 0.1–0.7
Li$_2$O: 1–2.5
K$_2$O: 1–3.

4. An enamel composition according to claim 1 wherein said crystallization represents less than 50% by volume of the enamel.

5. An enamel composition according to claim 1 wherein said glass-ceramic has a composition within the Li$_2$O—Al$_2$O$_3$—SiO$_2$ system and beta-spodumene solid solution or beta-quartz solid solution constitutes the principal crystal phase.

* * * * *